(12) United States Patent
Amadio et al.

(10) Patent No.: US 9,766,766 B2
(45) Date of Patent: Sep. 19, 2017

(54) ASSOCIATION OF DISPLAY ELEMENTS

(75) Inventors: Louis Amadio, Sammamish, WA (US);
Keira L. Amos, Seattle, WA (US);
Charles Cummins, Seattle, WA (US);
Neel Ishwar Murarka, San Francisco, CA (US); Phillip Bensaid, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 630 days.

(21) Appl. No.: 12/862,177

(22) Filed: Aug. 24, 2010

(65) Prior Publication Data
US 2010/0318932 A1    Dec. 16, 2010

Related U.S. Application Data

(63) Continuation of application No. 11/381,869, filed on May 5, 2006, now Pat. No. 7,783,990.

(51) Int. Cl.
*G06F 3/0481*    (2013.01)

(52) U.S. Cl.
CPC .................. *G06F 3/0481* (2013.01)

(58) Field of Classification Search
CPC ...... G06F 3/0481; G06F 3/048; G06F 3/0482; G06F 2203/04804
USPC ....................................... 715/811
See application file for complete search history.

(56) References Cited

U.S. PATENT DOCUMENTS

| 5,146,556 | A |   | 9/1992  | Hullot et al. |
|-----------|---|---|---------|---------------|
| 5,390,295 | A |   | 2/1995  | Bates et al.  |
| 5,561,757 | A |   | 10/1996 | Southgate     |
| 5,602,997 | A |   | 2/1997  | Carpenter et al. |
| 5,644,737 | A |   | 7/1997  | Tuniman et al. |
| 5,659,693 | A |   | 8/1997  | Hansen et al. |
| 5,692,142 | A |   | 11/1997 | Craycroft et al. |
| 5,760,767 | A | * | 6/1998  | Shore et al. .................. 715/723 |
| 5,790,120 | A |   | 8/1998  | Lozares et al. |
| 5,819,055 | A |   | 10/1998 | MacLean et al. |
| 5,880,725 | A |   | 3/1999  | Southgate     |
| 5,923,326 | A |   | 7/1999  | Bittinger et al. |
| 5,973,670 | A |   | 10/1999 | Barber et al. |
| 6,008,809 | A |   | 12/1999 | Brooks        |
| 6,052,456 | A |   | 4/2000  | Huang         |
| 6,057,834 | A |   | 5/2000  | Pickover      |
| 6,133,914 | A |   | 10/2000 | Rogers et al. |
| 6,154,771 | A |   | 11/2000 | Rangan et al. |
| 6,166,738 | A |   | 12/2000 | Robertson et al. |
| 6,232,971 | B1 |  | 5/2001  | Haynes        |
| 6,262,724 | B1 |  | 7/2001  | Crow et al.   |
| 6,353,451 | B1 |  | 3/2002  | Teibel et al. |
| 6,429,883 | B1 |  | 8/2002  | Plow et al.   |

(Continued)

OTHER PUBLICATIONS

Delaney, Kevin J. (Wall Street Journal) Google Helps Clients Get Personal, Aug. 22, 2005, 3 pages.

(Continued)

*Primary Examiner* — Sara England

(57) ABSTRACT

A system and method is provided for displaying a display element on a display in which a display element may be displayed responsive to a command, the display element being associated with another display element. Also, in another example, the association between the display elements is also displayed. In one example, the association between the display elements is depicted via an animation.

20 Claims, 16 Drawing Sheets

(56) References Cited

U.S. PATENT DOCUMENTS

| | | |
|---|---|---|
| 6,437,758 B1 | 8/2002 | Nielsen et al. |
| 6,717,593 B1 | 4/2004 | Jennings |
| 6,724,403 B1 | 4/2004 | Santoro et al. |
| 6,907,580 B2 | 6/2005 | Michelman et al. |
| 6,928,620 B1 | 8/2005 | Crangle et al. |
| 7,019,743 B1 | 3/2006 | Wainwright et al. |
| 7,051,019 B1 | 5/2006 | Land et al. |
| 7,143,160 B2 | 11/2006 | Tamaki |
| 7,325,204 B2 | 1/2008 | Rogers |
| 7,343,567 B2 | 3/2008 | Mann et al. |
| 7,352,204 B2 | 4/2008 | Frisch |
| 7,391,423 B1 | 6/2008 | Manzari et al. |
| 7,669,140 B2 | 2/2010 | Matthews et al. |
| 7,720,834 B2 | 5/2010 | Ali et al. |
| 7,783,990 B2 | 8/2010 | Amadio et al. |
| 7,788,248 B2 | 8/2010 | Forstall et al. |
| 2001/0035882 A1 | 11/2001 | Stoakley et al. |
| 2002/0008719 A1 | 1/2002 | Miyawaki et al. |
| 2002/0057287 A1 | 5/2002 | Crow et al. |
| 2002/0083101 A1* | 6/2002 | Card et al. ............... 707/526 |
| 2002/0089546 A1 | 7/2002 | Kanevsky et al. |
| 2002/0186257 A1 | 12/2002 | Cadiz et al. |
| 2003/0058286 A1 | 3/2003 | Dando |
| 2003/0103072 A1* | 6/2003 | Ko ............................. 345/710 |
| 2003/0107604 A1 | 6/2003 | Ording |
| 2003/0120731 A1 | 6/2003 | Weinberg et al. |
| 2003/0189597 A1 | 10/2003 | Anderson et al. |
| 2004/0003096 A1 | 1/2004 | Willis |
| 2004/0056894 A1 | 3/2004 | Zaika et al. |
| 2004/0056900 A1* | 3/2004 | Blume ...................... 345/807 |
| 2004/0066414 A1 | 4/2004 | Czerwinski et al. |
| 2004/0212640 A1 | 10/2004 | Mann et al. |
| 2004/0261037 A1 | 12/2004 | Ording et al. |
| 2005/0044058 A1 | 2/2005 | Matthews et al. |
| 2005/0044491 A1 | 2/2005 | Peterson |
| 2005/0060664 A1 | 3/2005 | Rogers |
| 2005/0125739 A1 | 6/2005 | Thompson et al. |
| 2005/0149879 A1 | 7/2005 | Jobs et al. |
| 2005/0198584 A1 | 9/2005 | Matthews et al. |
| 2005/0251753 A1 | 11/2005 | Sawyer |
| 2005/0268249 A1 | 12/2005 | Colaco-Dias |
| 2006/0010394 A1 | 1/2006 | Chaudhri et al. |
| 2006/0015818 A1 | 1/2006 | Chaudhri et al. |
| 2006/0206454 A1 | 9/2006 | Forstall et al. |
| 2006/0236216 A1 | 10/2006 | Blackwell |
| 2007/0226734 A1 | 9/2007 | Lin et al. |
| 2007/0260999 A1 | 11/2007 | Amadio et al. |
| 2007/0288860 A1 | 12/2007 | Ording et al. |
| 2009/0132942 A1 | 5/2009 | Santoro et al. |

OTHER PUBLICATIONS

Dollner, Jurgen et al., Interactive, Animated 3D Widgets, FB 15, Institut fur Informatik, Westfalische Wilhelms-Universitat, Einsteinstr, 62, 48149 Munster, Germany, undated, 9 pages.

Google debuts, Google Gadgets, May 10, 2006, 2 pages.

Google, Sidebar to Launch Monday, Aug. 21, 2005, 8 pages.

Gutierrez, Mario et al., The Mobile Animator: Interactive Character Animation in Collaborative Virtual Environments, Virtual Reality Lab (VRlab), IEEE Virtual Reality, Mar. 27-31, 2004, pp. 125-131 and 284.

Perlin, Ken et al., Nested User Interface Components, NYU Media Research Lab, UIST 1999, pp. 11-18.

Ziff Davis Media Inc., Apple Previews Mac OSX "Tiger", Jun. 28, 2004, 8 pages.

Ziff Davis Media Inc., Mac 'widget' App Set to Make Windows Debut, Nov. 8, 2004, 4 pages.

"Final Office Action", U.S. Appl. No. 11/381,869, Feb. 5, 2010, 13 pages.

"Non-Final Office Action", U.S. Appl. No. 11/381,869, Jul. 7, 2008, 13 pages.

"Non-Final Office Action", U.S. Appl. No. 11/381,869, Jul. 10, 2009, 13 pages.

"Final Office Action", U.S. Appl. No. 11/381,869, Jan. 28, 2009, 19 pages.

"Notice of Allowance", U.S. Appl. No. 11/381,869, Jun. 14, 2010, 6 pages.

* cited by examiner

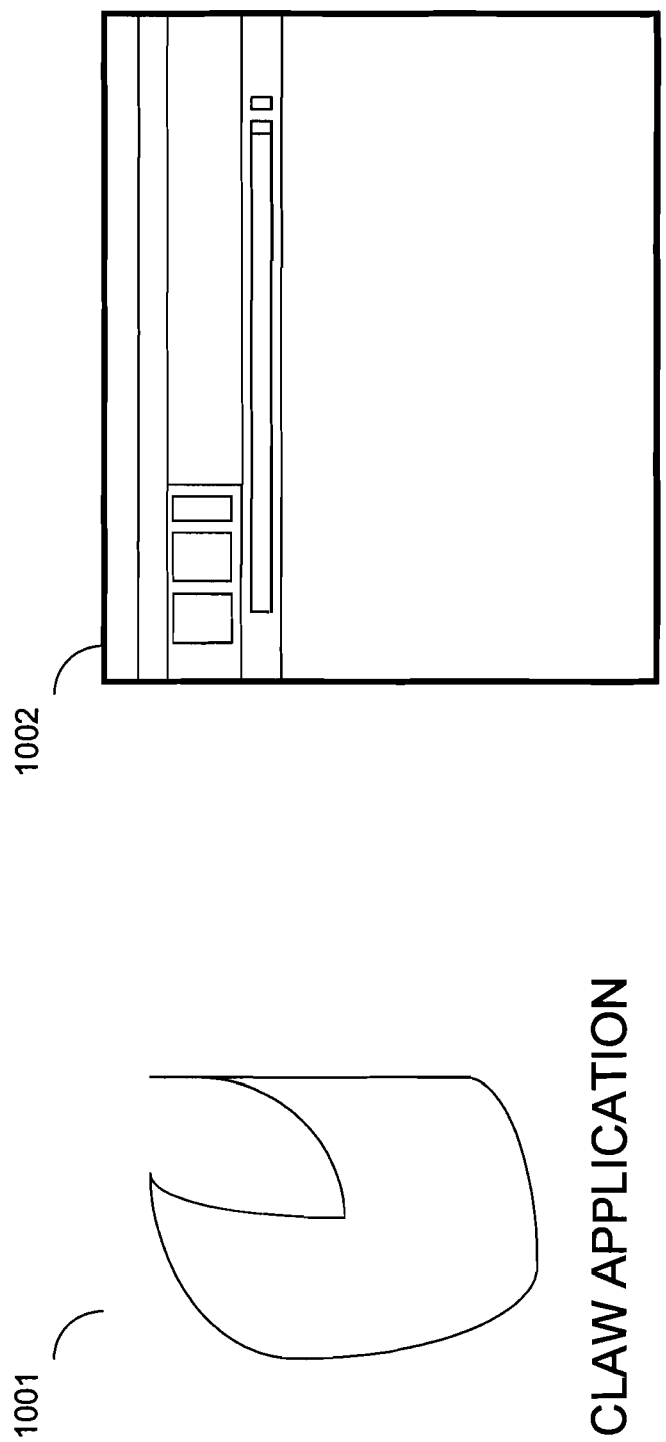

ASSOCIATION OF DISPLAY ELEMENTS

CROSS-REFERENCE TO RELATED APPLICATION(S)

This application is a continuation of U.S. Ser. No. 11/381,869, filed May 5, 2006, the entire contents of which are incorporated herein by reference.

BACKGROUND

Computer displays are used to display a variety of components such as windows or icons. Often, one window presented on a computer display may have a second window that provides additional information pertaining to the (first) window. As an example, a first window may contain a link to a second window such that selection of the link within the first window launches a second window that is referenced by the link. The second window may provide information that is related to the first window and may thus be related to or "associated with" the first window. Likewise, additional information for an icon may be displayed such that a user may be informed about details about the icon. Such information may include, for example, whether the icon is a shortcut icon, file size of the icon or application program to which the icon refers, etc. This information may be provided in a window or menu display.

However, when multiple windows, icons or any other items are concurrently displayed on a computer display, the user may easily become confused as to which windows or items, if any, are related to each other. FIG. 9 illustrates an example of multiple windows displayed on a computer display. When a user is confronted by a complex display such as the display of FIG. 9, the user may find it difficult to identify which windows provide information for other windows. For example, a computer display 914 may contain any number of icons. As illustrated in FIG. 9, the computer display 914 contains icons 901-906. Activation of any of the icons 901-906 may launch a corresponding window such as any one of windows 907-913 as illustrated in FIG. 9. Upon inspection of the computer display 914 illustrated in FIG. 9, a user may have difficulty determining which one of icons 901-906 launched (and hence, is associated with) each one of the displayed windows 907-913. Hence, a complex array of items displayed on a computer display would result in confusion for the user.

SUMMARY

According to an illustrative aspect, a method in a computer system is provided for displaying a first display element, such as a window, menu, icon, thumbnail, modal window, etc., and for displaying a second display element associated with the first display element. In another example, the association between the display elements may also be displayed.

In another example, the association between display elements may be provided via an animation. For example, the animation may include a depiction of relative sizes, size changes, or positioning of display elements.

In another example, a system is provided for displaying display elements and an association between the display elements.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 10A illustrates an example of an icon as a display element.

FIG. 10B illustrates an example of a window as a display element.

DETAILED DESCRIPTION

Figure 1:
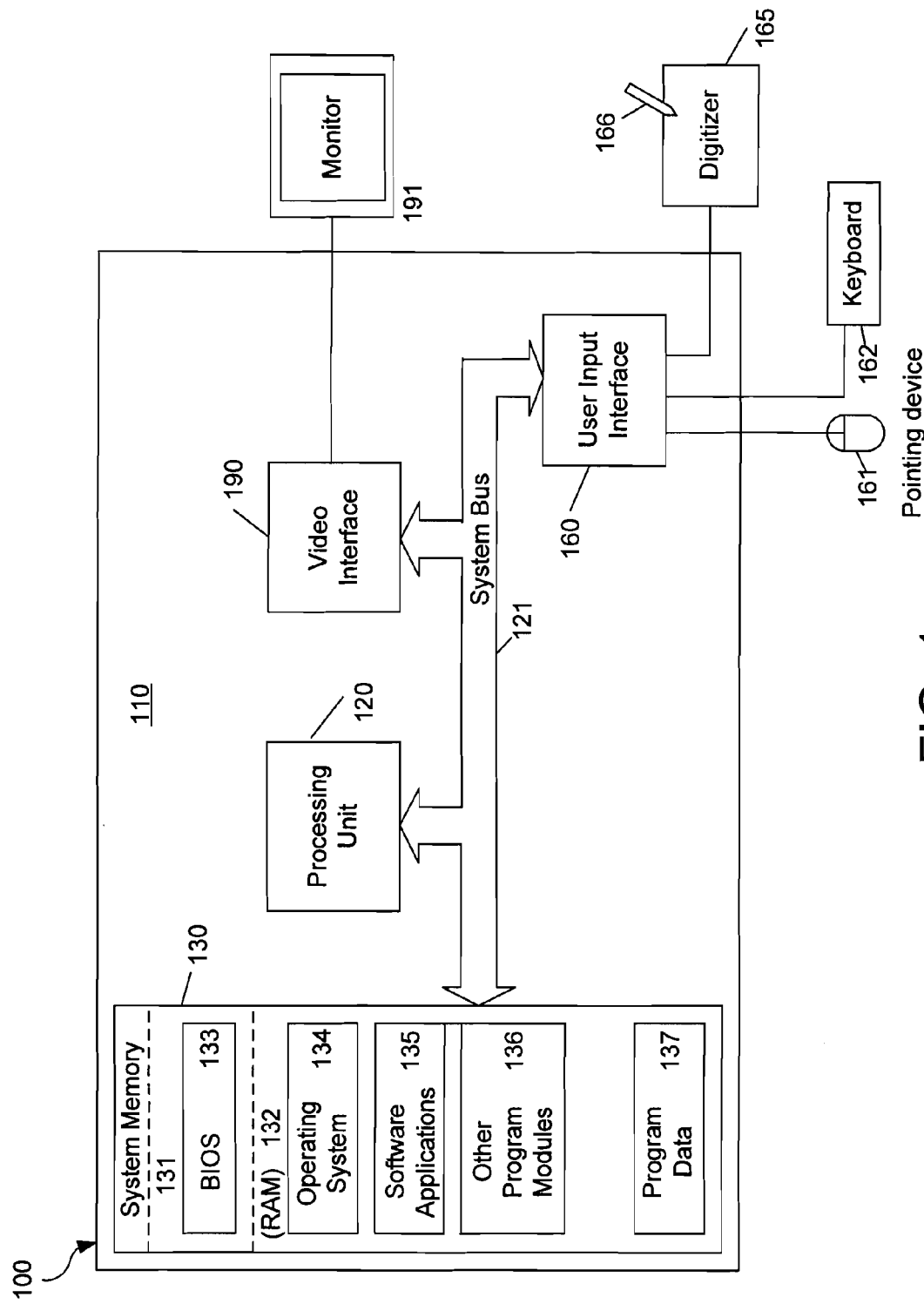
FIG. 1 is a partial block diagram illustrating an example of a system for implementing various features which includes a general purpose computing device in the form of a computer.

Examples provided herein may be implemented in a variety of operating environments. FIG. 1 is a partial block diagram illustrating an example of one suitable computing system environment 100. The computing system environment 100 is only one example of a portion of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Various aspects are operational with numerous other general purpose or special purpose computing system environments or configurations. Examples of well known computing systems, environments, and/or configurations that may be suitable for use with the invention include, but are not limited to, personal computers, server computers, handheld or laptop devices, multiprocessor systems, microprocessor-based systems, programmable consumer electronics, network PCs, minicomputers, mainframe computers, distributed computing environments that include any of the above systems or devices, and the like.

With reference to FIG. 1, an illustrative system includes a general purpose computing device in the form of a computer 110. Components of computer 110 may include, but are not limited to, a processing unit 120, a system memory 130, and a system bus 121 that couples various system components including the system memory 130 to the processing unit 120.

Computer 110 typically includes a variety of computer readable media. Computer readable media includes both volatile and nonvolatile media, removable and non-removable media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

A user may enter commands and information into the computer 110 through input devices such as a keyboard 162, a digitizer 165 and stylus 166, and/or a pointing device 161, commonly referred to as a mouse, trackball or touch pad. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190.

The monitor 191 may display a variety of items pertinent to a computer. Such items are referred to as display elements. The term "display element," as used herein, refers to any item or component that may be displayed on a computer display. Hence, a display element may include an icon, a window, menu, modal window, thumbnail, etc.

FIG. 10A illustrates an example of an icon 1001 as a display element. In this example, the icon 1001 represents an application program such as software application 135 (such as "claw application" in this example). Selection of the icon 1001 results in the activation and launching of the software application 135 that corresponds to the icon 1001. For example, input via the pointer device 161, keyboard 162, or digitizer/stylus 165, 166 via the user input interface 160 may cause a processing unit 120 to access the software application 135 in RAM 132 over system bus 121. The software application may produce a display element via the processing unit 120, which may provide the display element (e.g., a corresponding window) on the computer monitor 191 via a video interface 190. The window thus displayed is a display element that is also associated with the icon 1001 in the sense that activation of the icon 1001 causes the window to appear on the computer monitor 191.

Display elements may be "associated with" other display elements. Hence, in this context, the term "associated with" or "association" refers to a relationship between the display elements in which one display element may be subordinate to another primary (or host) display element. "Subordinate," as used herein, refers to one display element (the "subordinate" display element) blocking the usage of the other (primary or host) display element when the subordinate display element is displayed. After the subordinate display element is no longer displayed, the function or interactivity of the primary/host display element returns.

For example, when the associated display elements are user-interactive (i.e., responsive to user input), the display of a subordinate user-interactive display element causes the user interactivity of the associated primary or host display element to cease. In this example, a user may not input data into the primary or host display element while the subordinate display element is displayed. When the subordinate display element is no longer displayed, the user may input data into the primary host display element.

In another example, if dynamic information (i.e., information that changes in real-time and is updated in real-time) is provided in the display elements, the display of a subordinate display element providing updated dynamic information may cause the associated primary or host display element to cease providing updated dynamic information while the subordinate display element is displayed. When the subordinate display element is no longer displayed, then the primary or host display element may continue providing updated dynamic information.

This "relationship" between the display elements may demonstrate that the associated, subordinate or primary/host, or related display elements are connected in one of the ways set forth below.

Specifically, as used herein, display elements are "associated with" each other when each of the display elements provides information regarding the same entity with one display element being subordinate to the other primary or host display element such that the subordinate display element blocks the usage of the primary display element. For example, if a first window provides real-time information of traffic conditions in New York City and a second window is displayed in conjunction with the first window and provides real-time information of traffic conditions in Greenwich Village of New York City such that the display of the second window blocks usage of the primary or host (i.e., the first) window, the first and second window would be considered "associated" with each other in this context.

Two display elements can also be "associated" with each other if the appearance of one of the display elements is dependent on the presence, selection or activation of the other display element and blocks the usage of the other display element (i.e., a first display element is subordinate to and blocks the usage of an associated second display element). As an example, if a first display element is presented on a display and a second display element appears on the display after the first display element is selected or acted upon (e.g., receives user input), then the first and the second display elements are "associated" with one another when the appearance of the second display element blocks the usage of the first display element. Alternatively, if a second display element appears on the display only upon display of the first display element and blocks the usage of the first display element upon display of itself, then the two display elements are said to be "associated" with one another. For example, a first window may be launched such that the first window appears on the display. If the appearance of the first window triggers the appearance of a second window (even if the first window might not be selected) and the second window is subordinate to the first window upon display of the second window such that the appearance/display of the second window blocks the usage of the first window, then the first window and the second window are said to be "associated" with one another.

Also, two display elements can be considered to be "associated" with one another if one display element displays information derived from the other display element with one of the display elements being subordinate to the other display element. For example, if a first display element displays the current price of a certain stock and a second display element provides more detailed information regarding the price of the stock (e.g., difference between the current price and the price at closing), the first display element and the second display element are "associated" with each other when the second display element, for example, is subordinate to the first display element such that the second display element blocks usage of the first or primary/host display element. For example, the first or primary/host display element may lose user interactivity capability while the second or subordinate display element is displayed.

A display element, as illustrated in the example of FIG. 10B, may also be a window 1002 on a computer monitor 191. The window 1002 is an element or item that may be displayed on a display, and thus constitutes a display element.

Figure 10C:
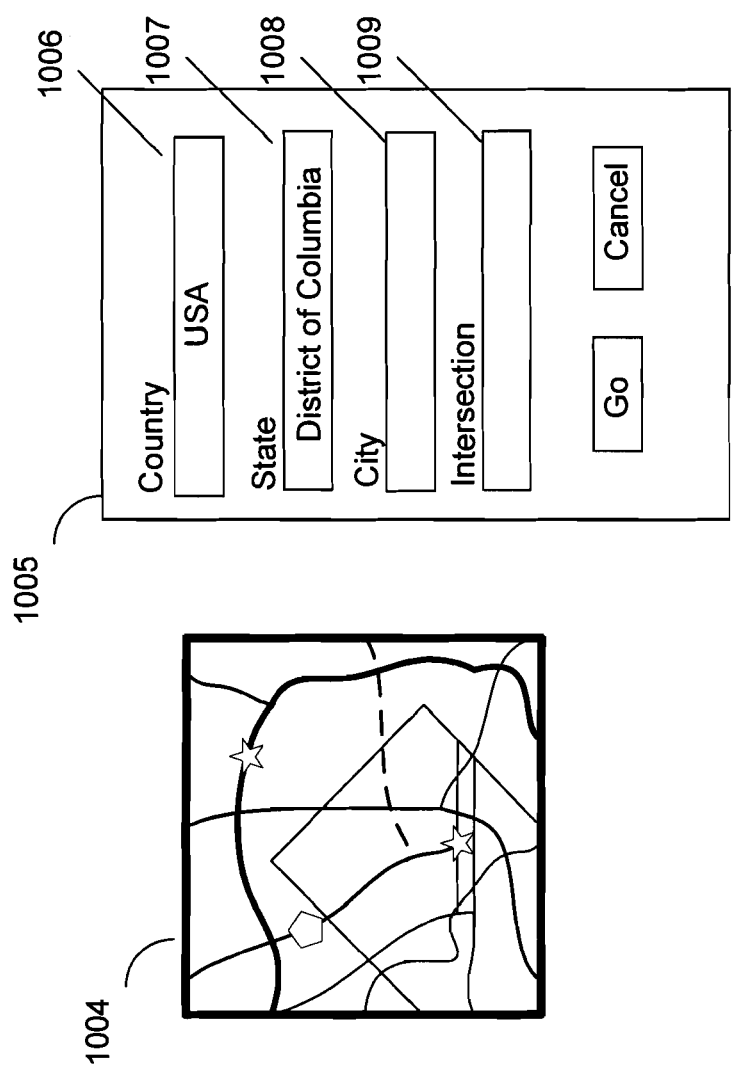
FIG. 10C illustrates an example of a dynamic thumbnail or gadget as a display element and an associated settings control window as an associated display element.

In addition, a display element may also be a settings control window through which data may be entered for controlling an application that is referred by (or is "associated with") the display element in which the settings control window may be subordinate to the application. FIG. 10C illustrates an example of a display element as a thumbnail 1004 displayed on the computer monitor 191, which may provide information desired by a user. In this example, the thumbnail 1004 provides dynamic traffic information that describes the current traffic conditions in an area of interest. Characteristics of the thumbnail 1004 may be controlled by the user. Examples of such characteristics of the thumbnail may include the size of the thumbnail, the content of the thumbnail 1004, the general appearance of the thumbnail 1004, the color, shape, content, etc. The user may control these or other characteristics of the thumbnail 1004 as desired by entering parameters via a user interface displayed on the computer monitor 191 which may be associated with (or subordinate to) the thumbnail 1004. For example, a settings control window 1005 may be provided on the computer monitor 191 that may include fields through which a user may input desired parameters that may in turn control the appearance or function of the thumbnail 1004. In this example, a settings control window 1005 is displayed that contains fields 1006-1009 through which a user may input desired parameters for controlling the appearance of the traffic thumbnail 1004. For example, a desired country may be entered in the country field 1006, a desired state may be entered in the state field 1007, a desired city may be entered in the city field 1008, and an intersection at which traffic conditions are desired may be entered in the intersection field 1009. The traffic conditions at the indicated location entered in the settings control window 1005 may be displayed in real-time in the traffic thumbnail 1004. In addition, the settings control window 1005 is associated with the traffic thumbnail 1004 and the display of the settings control window 1005 blocks usage of the traffic thumbnail 1004. For example, real-time traffic information in the traffic thumbnail 1004 may no longer be accessible or may no longer be updated during display of the settings control window 1005.

Thumbnail display elements that provide dynamic information, such as the traffic thumbnail 1004 described above may be termed "gadgets." Gadgets may thus provide up-to-date information in real-time. There are many examples of gadgets in addition to the traffic thumbnail 1004 described above. Gadgets may also include thumbnails that provide real-time weather information (including forecast information), stock quote information, current traffic reports, sport scores, breaking news, etc. The information provided in a gadget may be termed "dynamic information" because the information is subject to updates and changes. As the information changes (e.g., stock quotes changing or weather information being updated), the information provided and displayed in the corresponding gadget changes accordingly. Hence, a gadget as displayed on a computer monitor 191 is a display element.

Figure 11A:
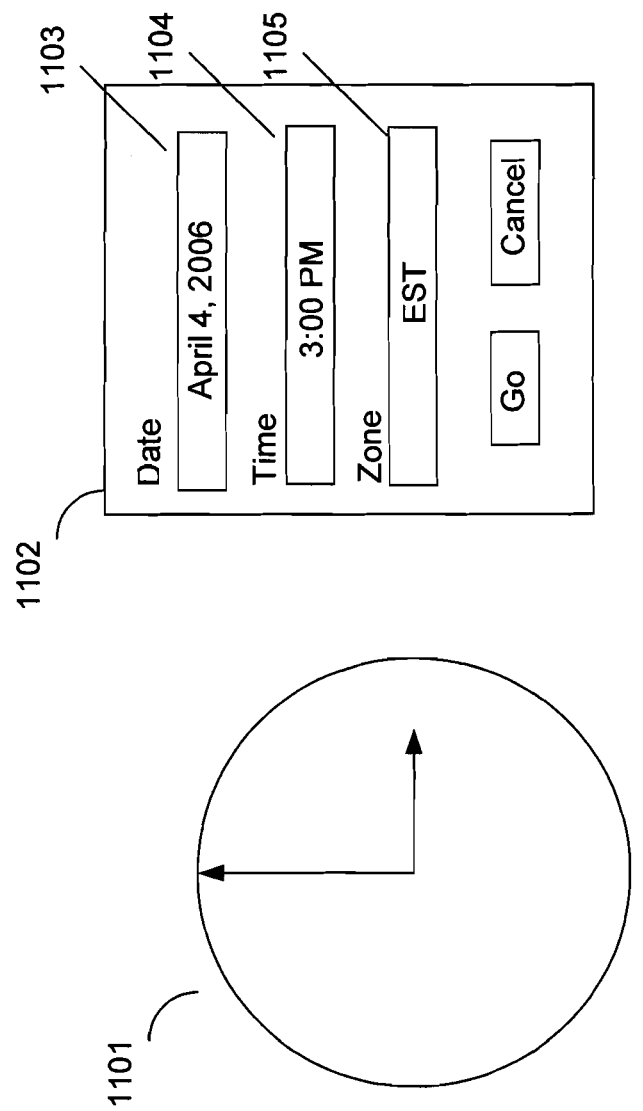
FIGS. 11A-11B illustrate examples of a clock gadget and associated display elements.

A gadget may also provide a second display element, which may provide additional information pertaining to the gadget itself. The second display element for providing the additional gadget information may be any type of component that may be displayed on a computer monitor 191. For example, the second display element may be a window or a menu. FIG. 11A illustrates an example of a gadget providing a second display element for displaying information pertaining to the gadget. In this example, the gadget is a clock 1101 which provides dynamic information (i.e., the current time and/or date) that is updated in real-time. The time (and/or date) may be adjusted via an associated displayed window such as a settings control window 1102 that is associated with the clock 1101. Hence, in this example, the settings control window 1102 is subordinate to the clock 1101 and display of the settings control window 1102 blocks usage of the clock 1101 (e.g., the clock 1101 may stop, become greyed out, or may not receive user input during display of the settings control window 1102). The settings control window 1102 may contain fields such as a date field 1103, a time field 1104, and a time zone field 1105. A user may control the appearance and/or function of the clock gadget 1101 via commands or parameters entered in the fields (1103-1105) of the setting control window 1102. For example, the user may control the date by entering a desired date in the date field 1103 or may adjust the time by entering a desired time in the time field 1104. Likewise, the user may change the time zone by entering a desired time zone in the time zone field 1104. The input information may then be reflected in the clock gadget 1101.

Figure 11B:
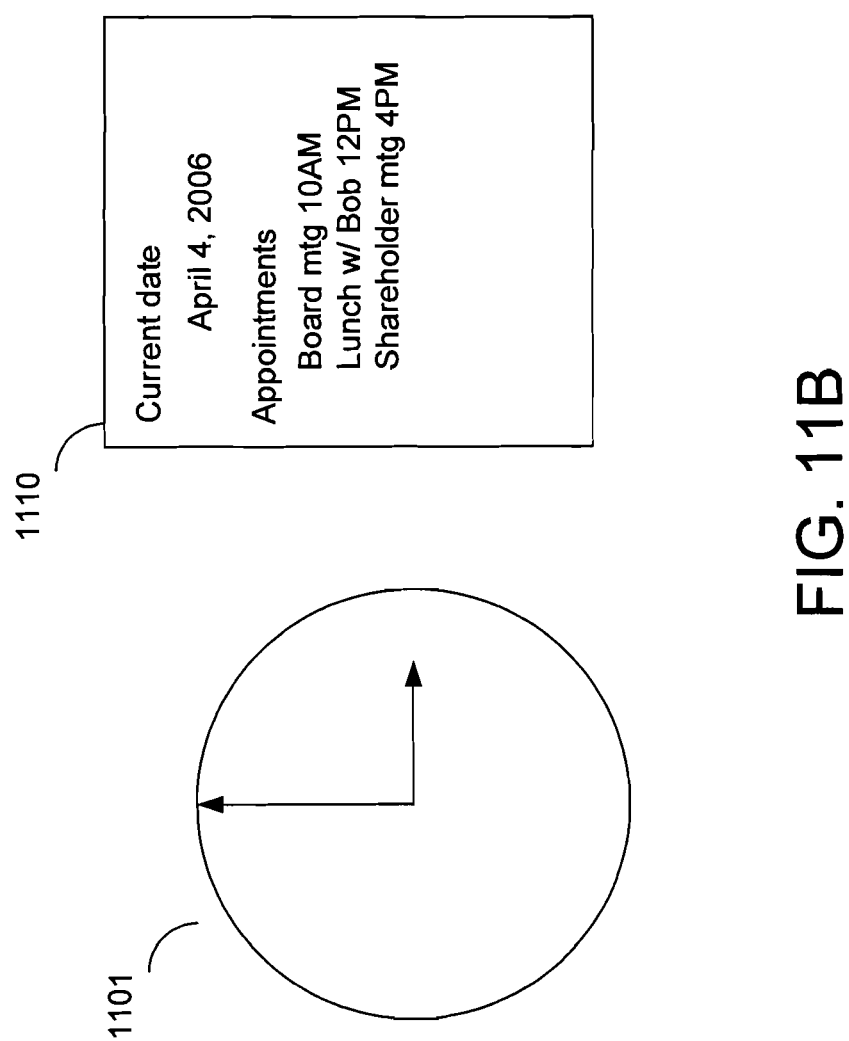

In addition to the displayed time, the clock gadget 1101 may also have additional information which might not be visible to a user when only the clock gadget 1101 is being displayed as illustrated in FIG. 11A. FIG. 11B illustrates another example of a second display element that is associated with the clock gadget 1101. The second display element in this example is a window 1110 that is displayed on the monitor 191 and is associated with and subordinate to the clock gadget 1101. The window 1110 is associated with the clock gadget 1101 in the sense that the window 1110 provides information that pertains to the clock gadget 1101 and is subordinate to the clock gadget 1101. Hence, in this example, the display of the window 1110 blocks usage of the clock gadget 1101. Also, selection of the clock gadget 1101 results in the appearance of the window 1110. Hence, the window 1110 and the clock gadget 1101 are associated with each other to the extent that both the window 1110 and the clock gadget 1101 provide information of a single entity (i.e., information pertaining to the date/time) and/or the appearance of one display element depends from the appearance or the selection of the other display element.

In this example, the window 1110 provides the date and a schedule of activities on the given date. This information is in addition to the information provided in the display of the clock gadget 1101. In one example, a user may select the clock gadget 1101 to launch the window 1110 to obtain the additional information. Hence, the window 1110 is associated with and is subordinate to (i.e., blocks usage of) the clock gadget 1101. However, this association between the window 1110 and the clock gadget 1101 may not be visually obvious to a user. For example, if the window 1110 is displayed far from the clock gadget 1101 and/or at a different time, the user may be unaware that the window 1110 and the clock gadget 1101 are associated with one another. In this example, the user may also not be aware that the window 1110 is displayed in association with the clock gadget 1101 or that the window 1110 is displayed as a consequence of an action on the clock gadget 1101 (e.g., clicking the clock gadget 1101).

Figure 12:
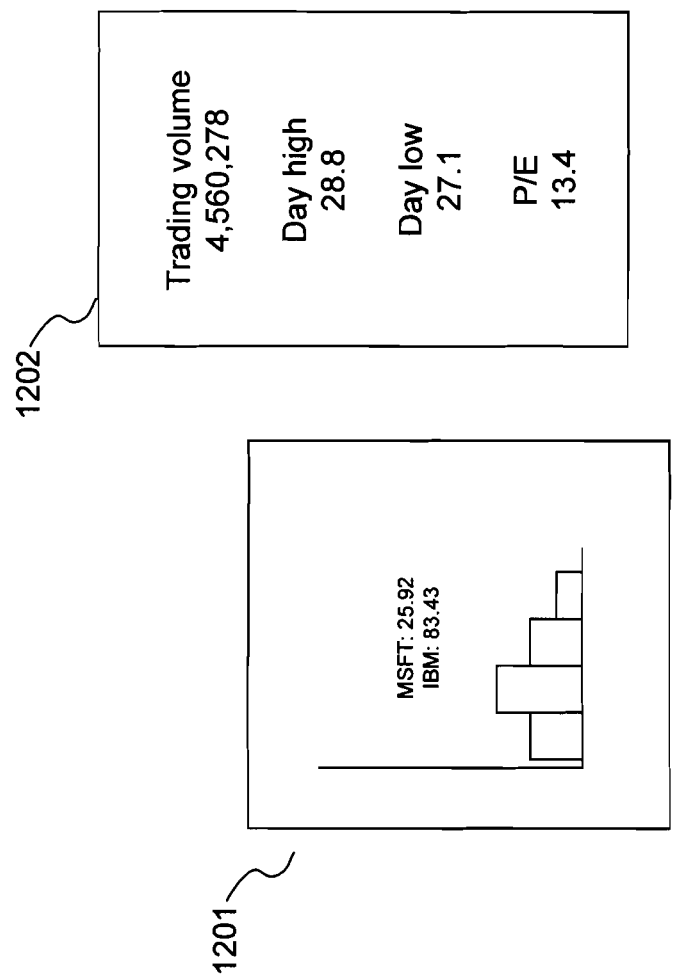
FIG. 12 illustrates an example of a stock quote gadget and an associated display element.

FIG. 12 illustrates another example of a displayed stock quote gadget 1201 and the display of a display element associated with the stock quote gadget. In this example, the stock quote gadget 1201 displays a current price of stocks of interest and the display element associated with the stock quote gadget 1201 is a window 1202 containing more detailed information on the stocks of interest. The window 1202 is associated with the stock quote gadget 1201 because the window 1202 displays information that is related to the information provided in the stock quote gadget 1201 and is subordinate to the stock quote gadget 1201 (i.e., blocks usage of the stock quote gadget 1201). In this case, the information provided in the window 1202 includes additional details of the information provided in the stock quote gadget 1201. As illustrated in FIG. 12, the stock quote gadget 1201 provides the current price of the stocks of interest. The window 1202 that is associated with the stock quote gadget 1201 provides additional information, for example, trade volume, P/E ratio, daily gains/losses, or charts/graphs illustrating the course of the stock prices. It is useful for the user viewing the stock quote gadget 1201 and the associated window 1202 to be aware of the association between the stock quote gadget 1201 and the associated window 1202. When the association between the stock quote gadget 1201 and the associated window 1202 is apparent to the user, the user may obtain a better understanding of the information provided in both the stock quote gadget 1201 and the associated window 1202 as the information from one source is received in a context with the other source. In one aspect, a visual representation of an association between display elements may be provided. For example, the association between display elements may be indicating by animation at least one of the display elements, for example either or both of stock quote gadget 1201 and the associated window 1202. Providing association between display elements by animation will be further described below.

Figure 13:
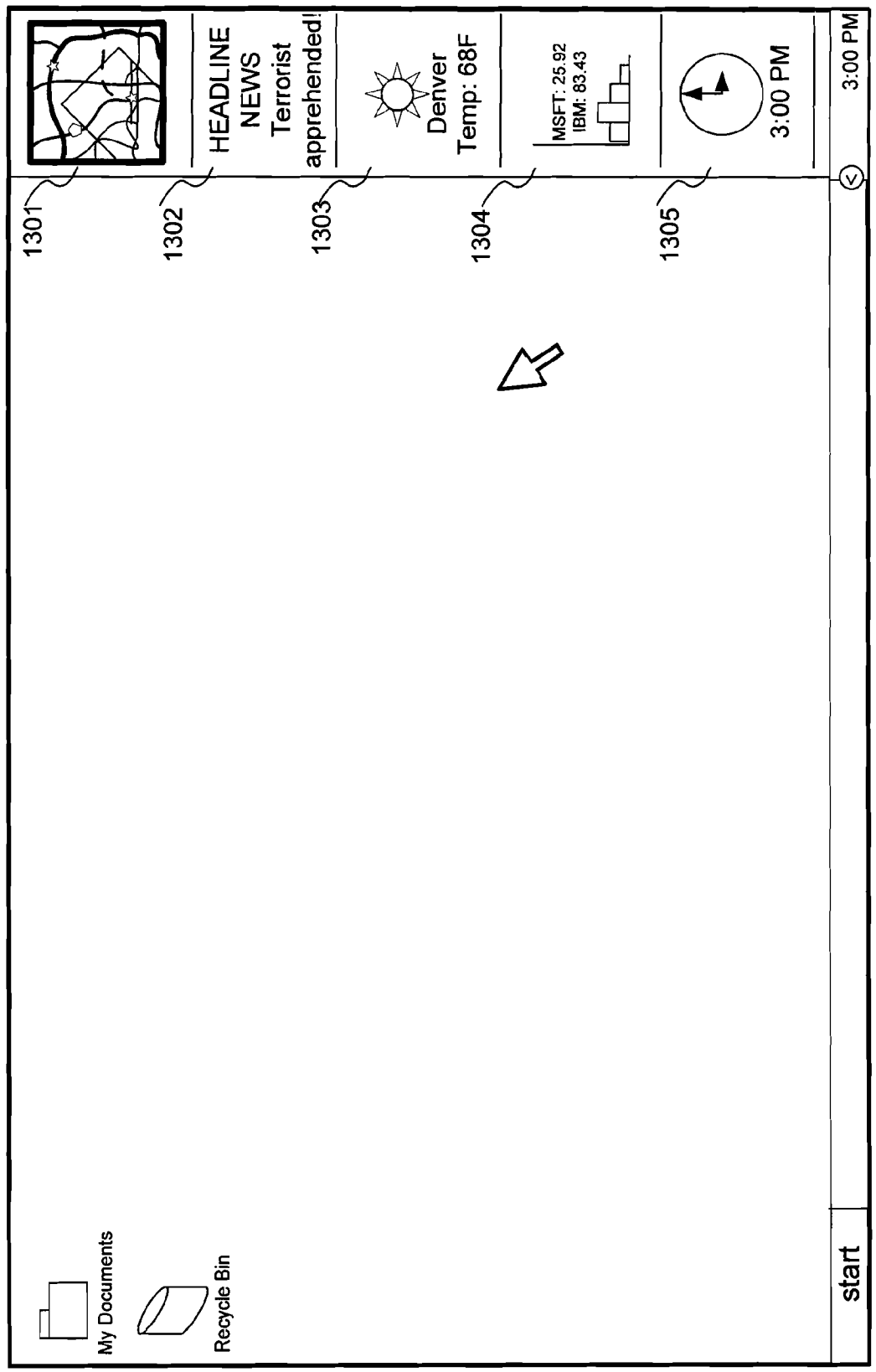
FIG. 13 illustrates an example of the display of multiple gadgets

FIG. 13 illustrates an example of the display of multiple display elements. In the example illustrated in FIG. 13, a set of gadgets (i.e., display elements) are displayed on the computer monitor 191. As seen in FIG. 13, a traffic gadget 1301, a headline news gadget 1302, a weather gadget 1303, a stock gadget 1304, and a time gadget 1305 are displayed. The traffic gadget 1301 provides up-to-the-minute traffic information at a location of interest, the headline news gadget 1302 provides the latest news, the weather gadget 1303 provides the current weather conditions and/or weather forecast in a selected location, the stock gadget 1304 provides information on a desired stock such as the current price, and the time gadget 1305 provides the current time and/or date. The information provided in the gadgets 1301-1305 is dynamic information as the dynamic information may be updated as the information changes. For example, as the price of the stock of interest changes, the current price may be reflected in the display of the stock gadget 1304.

Each of the gadgets 1301-1305 displayed in FIG. 13 may have an associated display element. A display element may be associated with a gadget if the display element contains information that pertains to information provided in the gadget or if the display of the display element is dependent in some way on the gadget itself. Also, a display element that is associated with any of the gadgets 1301-1305 blocks the usage of the corresponding gadget 1301-1305. As one example, if the display of the display element is dependent on the presence, selection or the activation of the gadget and blocks the usage of the gadget, then the display element is "associated with" the gadget.

Figure 14:
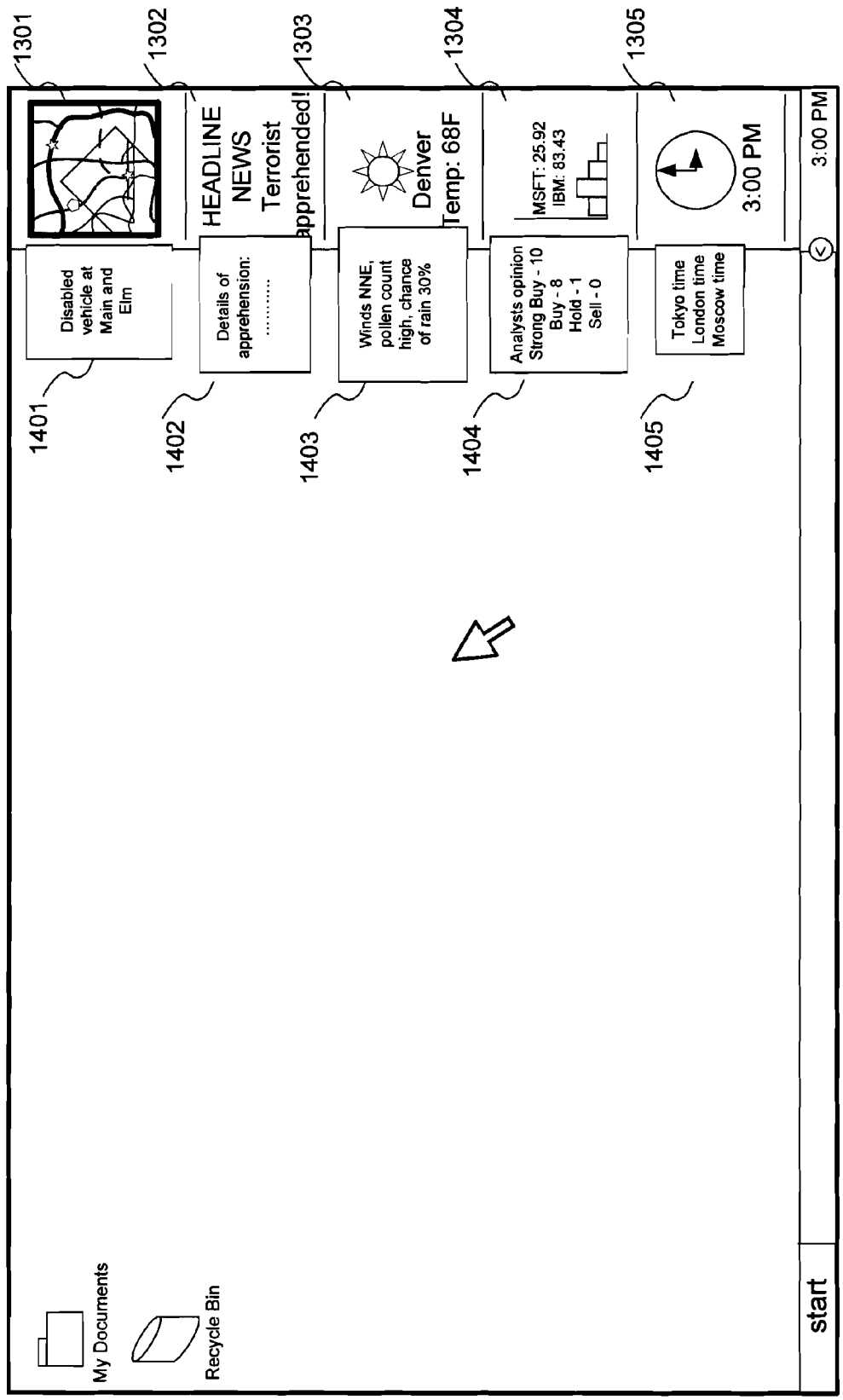
FIG. 14 illustrates an example of a display of multiple gadgets, each with an associated display element.

FIG. 14 illustrates each of the gadgets 1301-1305 of FIG. 13 with an associated display element. In this example, each of the gadgets 1301-1305 is associated with a specific window 1401-1405, the specific windows 1401-1405 providing additional detailed information pertaining to the information provided in each of the corresponding or associated gadgets. For example, the traffic gadget 1301 has an associated window 1401 that provides additional traffic information as desired. Also, display of the associated window 1401 blocks usage of the traffic gadget 1301. In this example, the traffic gadget 1301 provides a graphic display of the area of interest and major traffic conditions in the location of interest. The window 1401 which is associated with the traffic gadget 1301 may provide, as in this example, specific traffic conditions in more specific areas. In this example, the window 1401 indicates that a traffic impediment exists at Main and Elm streets. Therefore, the user may wish to avoid this intersection. The traffic gadget 1301 and the window 1401 are associated with each other because, in this case, the window 1401 is subordinate to the traffic gadget 1301 (i.e., the primary or host display element) and provides the information provided in the traffic gadget in more detailed form. By being subordinate to the traffic gadget 1301, the window 1401 blocks the usage of the traffic gadget 1301. Additionally, if selection or activation of the traffic gadget 1301 results in the appearance of the window 1401 on the display which blocks usage of the traffic gadget 1301, the traffic gadget 1301 and the window 1401 are said to be associated with one another.

Also, a headline news gadget 1302 may display brief news flashes to inform a user of news events that are currently occurring. The headline news gadget 1302 may further be selected or otherwise may cause the display of an associated display element, in this case, a window 1402 that may provide further details of the news event and may block usage of (i.e., be subordinate to) the headline news gadget 1301. The window 1402 and the headline news gadget 1302 are associated with each other in a similar manner as described above for the traffic gadget 1301 and associated window 1401.

Similarly, a weather gadget 1303 may provide general weather information at a desired location while a window 1403 that is associated with the weather gadget 1303 may provide more detailed weather information of the desired location. A stock gadget 1304 may provide a current stock price of a stock of interest and a window 1404 associated with the stock gadget 1404 may provide additional information on the stock such as analyst opinions. A time gadget 1305 may provide a current time at a user's location and a window 1405 associated with the time gadget 1305 may provide additional information such as the time in different time zones of interest. In any of these cases, a window associated with each of the gadgets 1301-1305 may be displayed with additional information corresponding to the information provided in the gadgets 1301-1305 themselves and may be subordinate to each corresponding gadget. Thus, each of the windows 1401-1405 may be associated with a specific gadget 1301-1305.

If a user viewing a display containing two associated or related display elements understands the association between the two display elements or that the two display elements are associated with one another, the user's understanding of the information provided therein is enhanced. For example, for a stock quote gadget as described above, when the user understands the association between the stock quote gadget and an associated window that provides additional information pertaining to the stock quote, the information provided in both the stock quote gadget and the associated window becomes more meaningful as the user may properly relate the information contained in the two display elements. As described below, the association may be visually presented to the user in a manner that more clearly indicates the association between the display elements.

In another example, the monitor 191 may be used to display an icon as the display element. The icon may further be selected to display another component such as a window that may provide information or data of an application program pointed to by the icon. Similarly, the monitor 191 may display an application window as another example of an item pertinent to the computer 110. For example, a software application 135 running on computer 110 may provide a window via a video interface 190 to the monitor 191. The window thus displayed on the monitor 191 may contain a demarcated region on the computer monitor 191 within which information may be provided to a user. A user may view the information within the window on the monitor 191 to obtain information provided by the software application 135.

Figure 2:
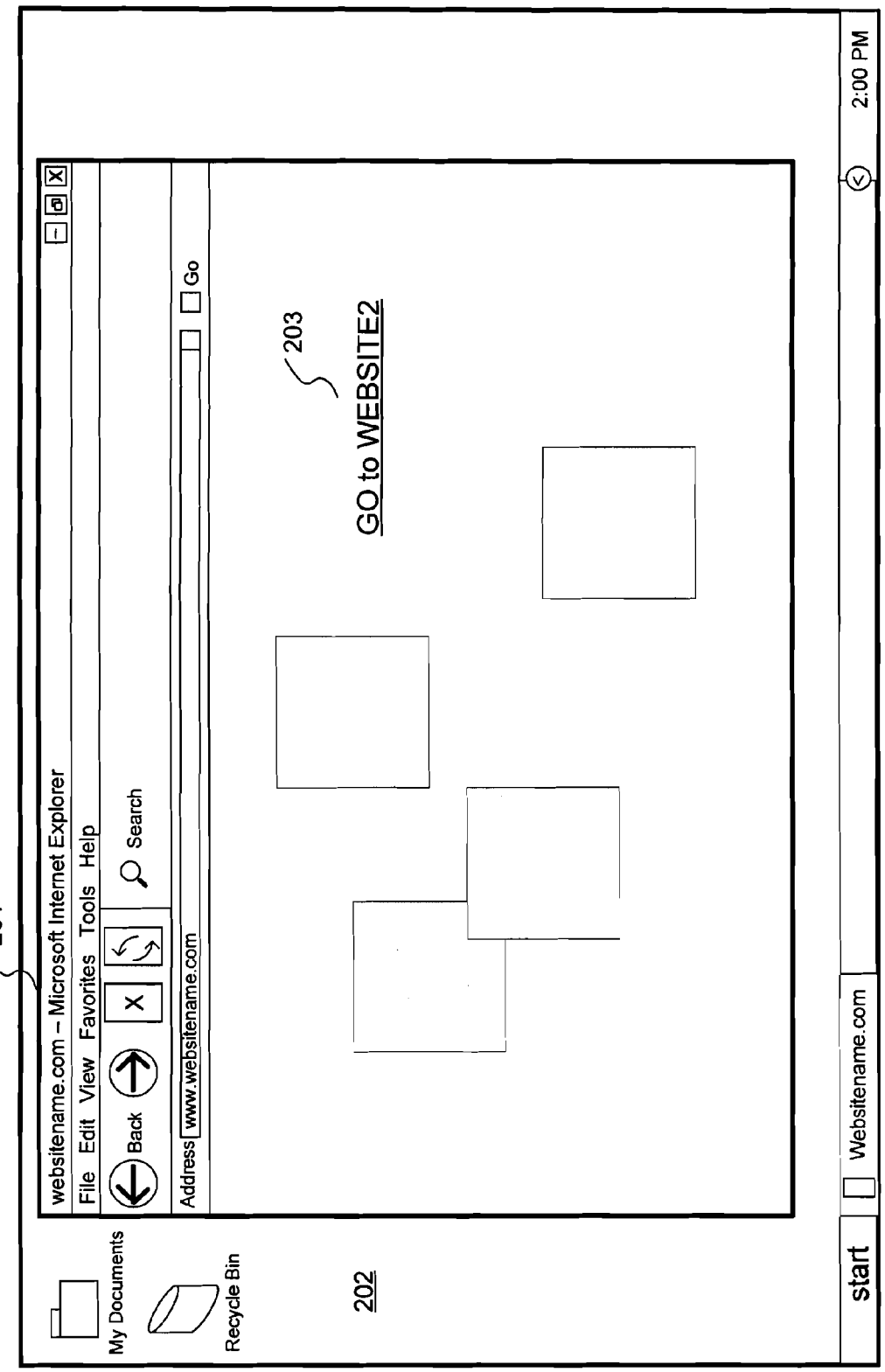
FIG. 2 illustrates an example of a display of a window as a display element.

FIG. 2 illustrates an example of a window of a software application 135 on a computer monitor 191. In this example, the software application 135 is running on a computer 110. A window 201 provided by the software application 135 is displayed on computer monitor 191 that contains information of the software application 135. Also in this example, the window 201 of the software application 135 provides a link 203 to a second window (not shown) the address of which is provided via the link 203. A user may select the link 203 in the window 201 to launch the second window. For example, the user may use the pointing device 161, keyboard 162 or the digitizer 165 and stylus 166 to input a selection of the link 203 in the window 201. This may cause the appearance of the second window on the computer monitor 191 that may be subordinate to the window 201. Hence, the second window is "associated with" the window 201 because, in this case, the link 203 provides a connection or association between the two windows (window 201 and second window) and display of the second window blocks usage of the window 201.

As described above, activation of the link 203 may be accomplished by input via a pointer device 161, keyboard 162, digitizer/stylus 165, 166 or other available input device. The input command may be received by the computer system 110 via a user input interface 160. The input command may further cause activation of an associated display element via communications via the system bus 121 and processing via the processing unit 120. For example, the processing unit 120 may, responsive to the input command received via the user input interface 160, access data from ROM 130 or RAM 132. Data may be obtained either locally or from a remote source. As one example, a software application 135 may be accessed in RAM 132 by the processing unit 120. Alternatively, other program modules 136 or program data 137 may provide data for an associated display element. The data is retrieved from ROM 130 or RAM 132 as described and is processed in the processing unit 120 to create a display element associated with the first display element. The associated display element may be sent via a system bus 121 to the monitor 191. Additional, the associated display element may be provided to the monitor 191 via a video interface 190. The associated display element may thus appear on the monitor 191.

Figure 3:
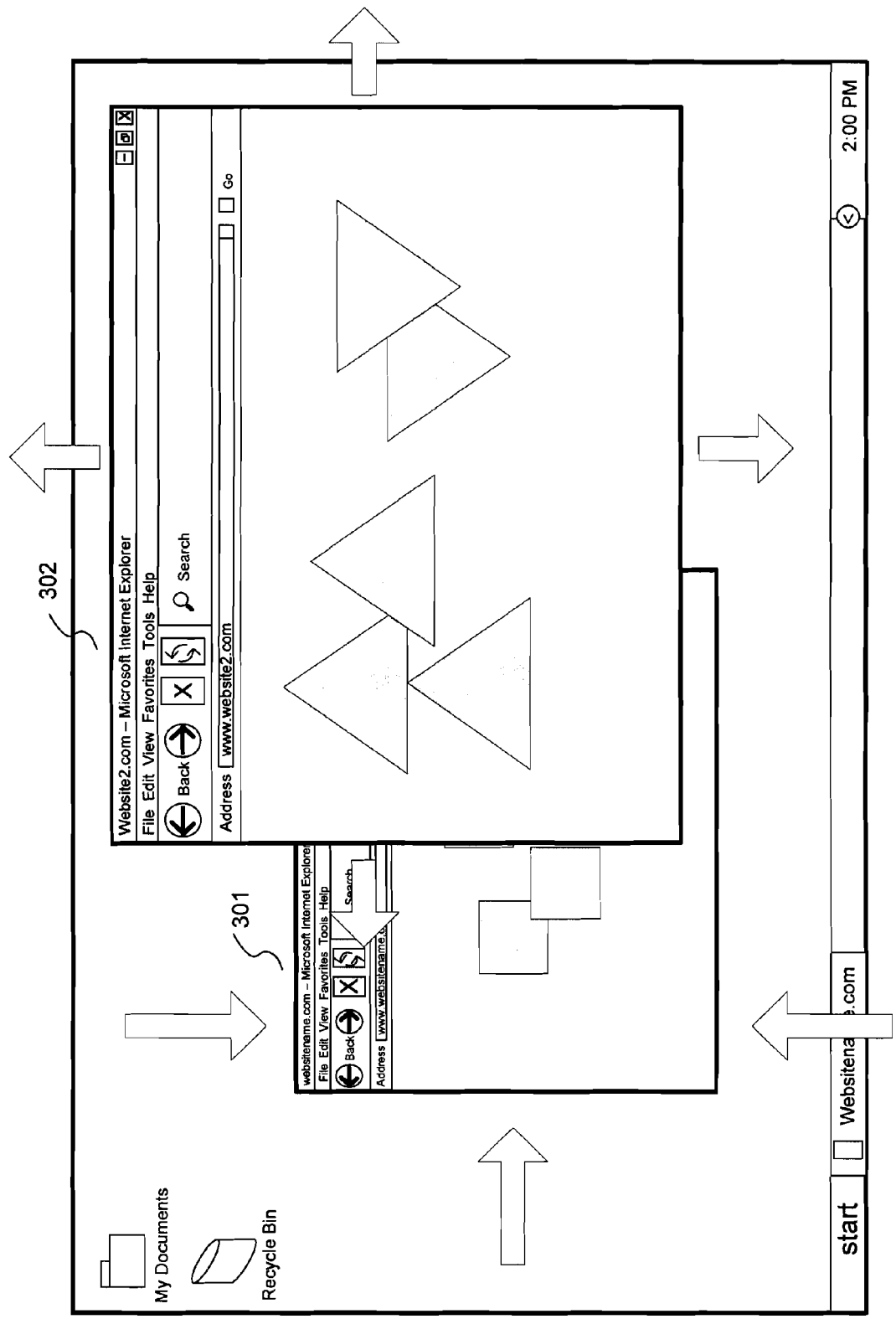
FIG. 3 illustrates an example of a display of the window of FIG. 2 and a second display element that is associated with the window of FIG. 2.

FIG. 3 illustrates an example of a display of associated display elements and an indication of an association between display elements. In this example, the indication is an animation that informs of the association between the display elements. The animation may be controlled by data stored in ROM 130 or in RAM 132. First window 301 (FIG. 3) corresponds to the window 201 of FIG. 2 after display of a second window 302 that is associated with window 201 (and window 301). As FIG. 3 illustrates, window 301 is smaller than window 201 of FIG. 2.

In this example, upon activation of the link 203 (FIG. 2), an animation is displayed to indicate the association between the first window 301 (which corresponds to window 201 in FIG. 2) and the second window 302. For example, the animation may include a depiction of the window 201 decreasing in size (as indicated by the arrows of FIG. 3) to achieve the size of first window 301. The animation may further include an appearance of the second window 302 while the size of window 201 decreases. In addition, the size of second window 302 may change while the size of the window 201 changes as part of the animation provided to indicate the association between the two display elements. Hence, the animation in this example may include a depiction of both the window 201 and the second window 302 changing size. In one example as illustrated in FIGS. 2 and 3, the animation includes the window 201 decreasing in size while the window 302 (associated with the window 201) appears and increases in size. In another example, the animation includes the size of window 201 increasing while the size of window 302 also increases. In yet another example, the size of the window 201 may increase while the size of window 302 also increases and the final size of the window 301 (corresponding to the resized window 201) is equal to or less than the size of the final size of window 302. Alternatively, the animation may include the window 302 appearing on the display responsive to activation of link 203 and then the size of window 302 decreasing (rather than increasing) while the size of window 201 either increases or decreases. As another example, the sizes of the window 201 and/or the associated window 302 may appear to increase, decrease, or both via the animation during a predetermined period of time following activation of the link 203 in a seemingly arbitrary manner.

Any of the changes in the sizes of the window 201 and/or the associated window 302 may occur over a predetermined period of time. For example, the animation may depict the window 201 changing size over a 1-5 second period of time (e.g., 1 second, 2 seconds, 3 seconds, 4 seconds, 5 seconds, etc.), over a period of less than 1 second (e.g., 0.1, 0.2, 0.3, 0.4, 0.5, 0.6, 0.7 seconds, etc.), over a period of time greater than 5 seconds, over a period of time on the order of nanoseconds or even instantaneously. Any desired length of time may be used. In addition, the predetermined period of time may be adjusted as desired by a user. Also, the period of time over which the window 201 changes size may or may not be the same as the period of time over which the associated window 302 changes in size.

Alternatively, the animation for indicating the association between the display elements (window 201 and associated window 302 in this example) may include the display elements changing in size either continuously or non-continuously. If the animation portrays a display element, such as window 201 or associated window 302 as changing in size continuously, then the animation may provide images (which may include moving images) of the size of the display element changing in smooth, non-stepwise transitions. Thus, the appearance of the animation when the change in size of a display element is continuous provides the appearance of the display element changing in size in smooth and fluid movements without skipping abruptly from one size to the next. The change in size may be depicted in the animation over a predetermined period of time as described.

When the animation portrays a display element as changing in size in a non-continuous fashion, the size of the display element may appear to change in a stepwise manner. In this example, the display element may be depicted via the animation at a first size for a first period of time without appearing to change in size during the period of time. At the end of the first period of time and at the beginning of a subsequent second period of time, the size of the display element appears to change abruptly to a second size that is different from the previous size. The display element may be depicted at the second size during the second period of time until the end of the second period of time and the beginning of a third period of time when the size of the display element may change in a stepwise fashion to a third size that is different from the second size. This process may repeat as many times as desired to provide an appearance (via the animation) of a stepwise change in size of the display element.

As mentioned above, the animation may depict the sizes of the display elements changing arbitrarily over a predetermined period of time (i.e., increasing in size, decreasing in size, and/or both). For example, at the beginning of the predetermined period of time, window 201 may be displayed at a first size. Window 201 may either increase or decrease in size after the predetermined period of time commences and may continue to either increase or decrease (or both) arbitrarily during the predetermined period of time. For example, the animation may depict the window 201 as appearing to increase in size, then decrease, then increase, then decrease during the predetermined period of time. Any number of changes in size of the first window 201, either continuously or non-continuously, may be represented by the animation. At the end of the predetermined period of time, the size of the window 301 may be smaller than the size of the window 201 at the beginning of the predetermined period of time. Alternatively, the size of the window 301 at the end of the predetermined period of time may be the same size or larger than the size of the window 201 at the beginning of the predetermined period of time.

In the example illustrated in FIG. 3, the predetermined period of time has elapsed and the size of the window 301 is smaller than the size of the associated window 302, the associated window 302 being associated with the window 301. Alternatively, the size of the first window 301 may be the same as or greater than the size of the associated window 302 as desired. According to one aspect, a user may control the resizing behavior of the first window 201/301 and the associated window 302.

The animation may include other elements to indicate the association between the display elements on a display. FIG. 3 also illustrates an animation depicting the association between window 301 and associated window 302 via relative placement of the display elements on the display. In this example, the animation may depict the associated window 302 in proximity to the window 301 to provide a visual association between the first window 301 and the associated window 302. The associated window 302 may also be displayed juxtaposed or adjacent to the first window 301 to demonstrate the association between the first window 301 and the second window 302. Alternatively, the first window 301 and the second window 302 may be displayed such that at least a portion of the first window 301 appears to contact at least a portion of the second window 302 to demonstrate the association between the first window 301 and the second window 302.

In the example illustrated in FIG. 3, the animation depicts the association between the window 301 and the associated window 302 as an appearance of the associated window overlapping the window 301. In a further example, other display elements on the display that are not associated with window 301 or associated window 302 (not shown) do not overlap window 301 and/or associated window 302.

Also, the animation may depict the association of the window 301 with the associated window 302 graphically and dynamically. For example, the animation may depict the associated window 302 appearing to spring from the window 201/301 upon activation of the link 203 in this example. Thus, when the associated window 302 is invoked (e.g., by activation of link 203 or by any other means), the associated window 302 that is associated with the window 201 may animate as a small window "springing from" the first window which increases in size, either continuously or non-continuously, during a predetermined period of time. Also, in another example, the first window 201 may decrease in size, by animation, during the predetermined period of time while the second window 302 increases in size by animation. Alternatively, the window 201 may appear via animation to increase in size during a predetermined period of time.

Hence, the animation may depict the associated window 302 as "springing from" the first window 201/301 and the first window 201/301 as receding by decreasing in size. Also, the associated window 302 may be displayed via the animation as a window on top of window 301. In this example, the associated window 302 (associated with window 301) is displayed as overlapping the first window 301 and covers a portion of the first window 301. Hence, by the end of the predetermined period of time, at least a portion of the associated window 302 is displayed as covering at least a portion of window 301.

The association between display elements may further be depicted by providing functionality of display elements in relation to associated display elements. For example, A second display element (associated with a first display element) may also gain control of the display such that the first display element may not receive input while the second display element is displayed (i.e., the second display element gains focus). In this example, a first display element may receive input from, for example, a user. Upon activation of the first display element or at least a portion of the first display element, a second display element that is associated with the first display element may be displayed. The second display element thus displayed may receive input from the user. In this example, if the second display element is displayed, the first display element may be unresponsive to user input. For example, a user may not enter data into the first display element when the second related display element is displayed. After the second display element is dismissed from the display, the first display element may again receive input from a user.

In one example, the second display element may be a modal window associated with the first display element. As one example to illustrate, the first display element may be an application window and the second display element that is associated with the application window may be a modal dialog box requiring user input. During display of the modal dialog box and prior to the user inputting the requested information into the modal dialog box, control may be with the modal dialog box such that input may be not be received in the first display element (i.e., the application window) during this time. Alternatively, both the first display element and the second display element may receive input when each is displayed.

Figure 4:
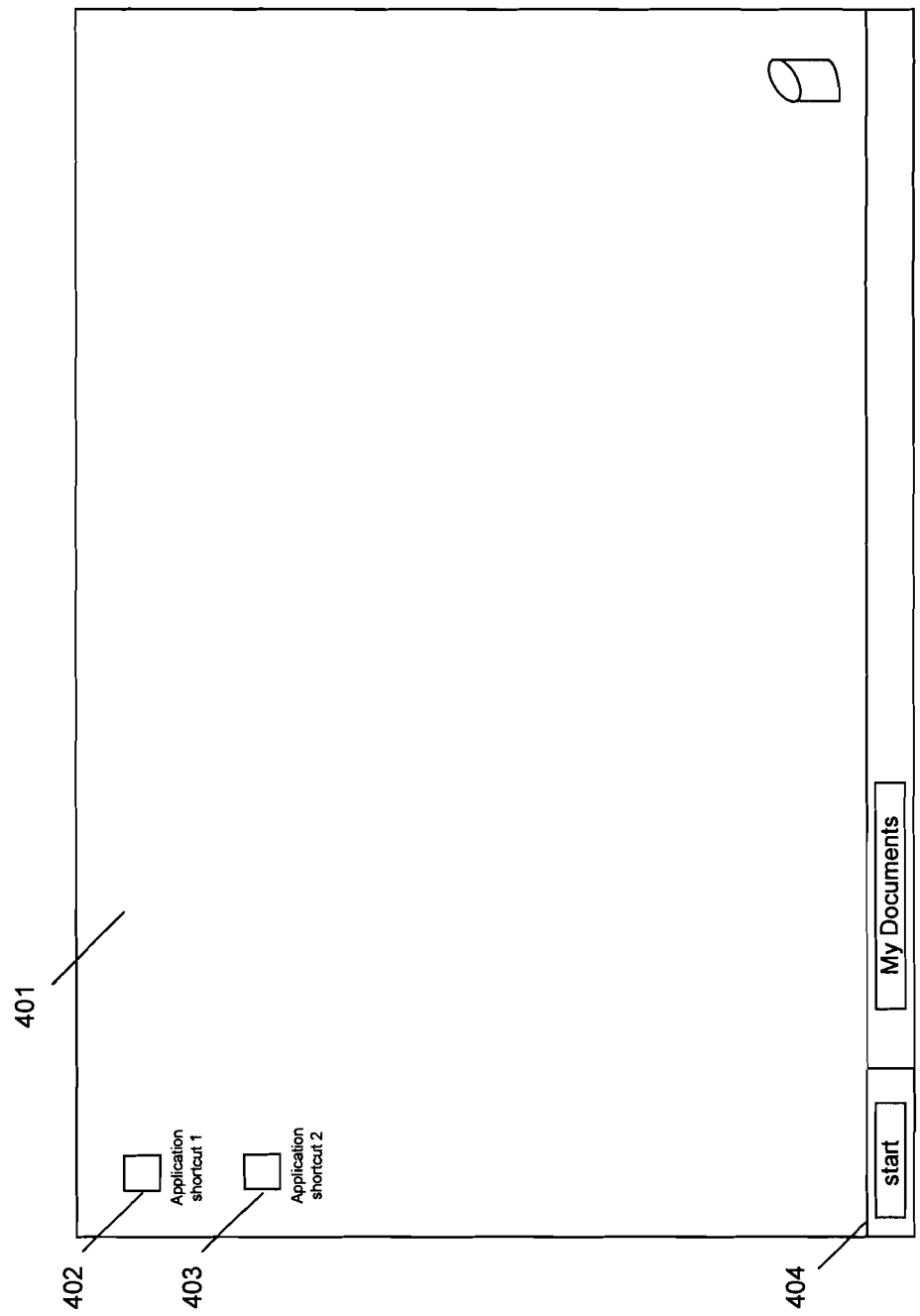
FIG. 4 illustrates an example of icons displayed on a display.

Other forms of display elements may also be displayed as associated or corresponding to other display elements. For example, an icon may be displayed on a desktop such that selection or activation of the icon may result in the display of an associated display element such as a window, dialog box, menu, etc. An animation may also be provided for depicting an association between the associated display element and the icon. FIG. 4 illustrates an example of icons as display elements on a display. The icons may further be used to invoke an associated window.

Figure 5:
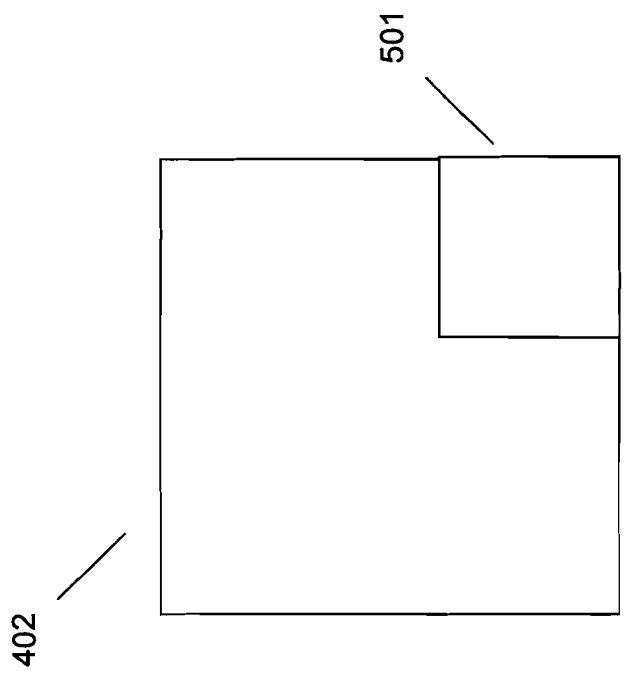
FIG. 5 illustrates an enlarged view of an icon in FIG. 4.

As FIG. 4 illustrates, a desktop 401 may contain icons (e.g., 402, 403). Also illustrated in FIG. 4 is a taskbar 404 on the desktop. In this example, the icons 402, 403 on the desktop may be activated such that an associated display element is displayed. For example, a portion of the icon may be configured to launch the associated display element. FIG. 5 illustrates an enlarged view of icon 402. As FIG. 5 illustrates, the icon 402 includes a portion 501 for invoking an associated display element. Thus, in this example, a user may activate the portion 501 of the icon 402 to display an associated display element.

Figure 6A:
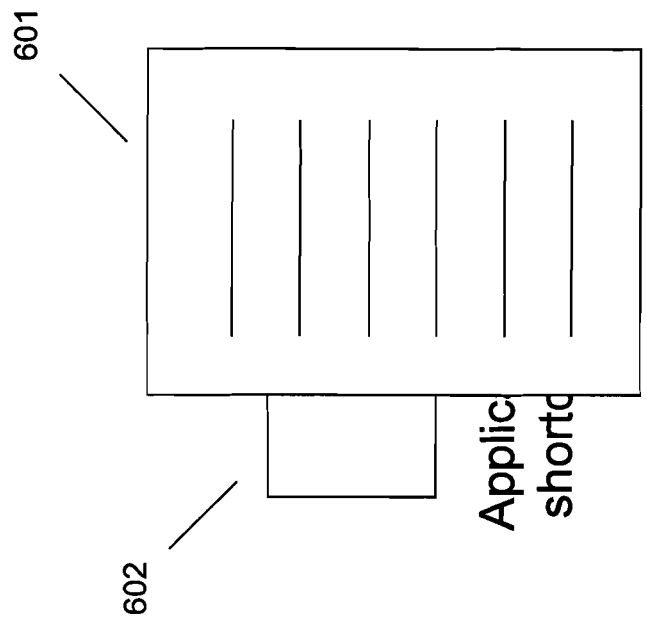
FIGS. 6A and 6B illustrate an icon where a portion of the icon is activated.
Figure 6B:
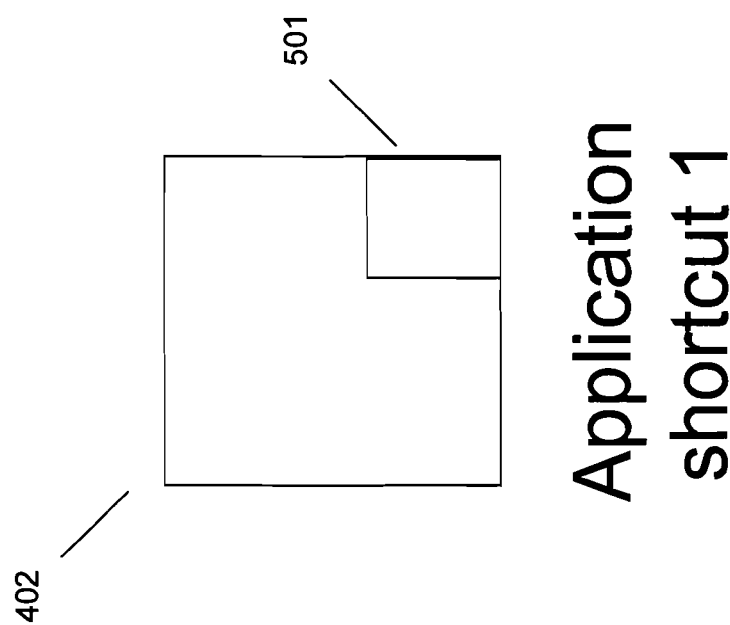

FIGS. 6A and 6B illustrate the icon 402 after activation of the portion 501 for displaying an associated display element. In this example, the display element associated with the icon 402 is a menu 601. FIG. 6A illustrates the icon 402 with the portion 501 for displaying the associated display element. The icon 402 is at a first size. FIG. 6B illustrates the icon 402 after activation of the portion 501 for displaying the associated display element where the icon 602 is at a second size, in this example smaller than the first size. After activation of portion 501 of the icon 402, the icon 402 may decrease in size such that icon 602, corresponding to icon 402 prior to activation of the associated display element 601, is smaller than icon 402. The change in size of the icon 402 may be depicted in an animation for providing a visual indication of the association between the icon 402/602 and the associated display element 601. Also, the associated display element 601 (in this case, a menu associated with the icon 402/602) is displayed at a larger size than the icon 602. Also, the associated display element 601 is displayed as overlapping the icon 602. Alternatively, the associated display element 601 may be displayed adjacent, juxtaposed, or in proximity to the icon 601.

The associated display element 601 may be displayed initially after activation of portion 501 of the icon 402 at a first size. The size of the associated display element 601 may increase, either continuously or non-continuously, over a predetermined period of time as described above. Alternatively, the size of the associated display element 601 may vary arbitrarily during the predetermined period of time (e.g., may increase in size, decrease in size, or both in an arbitrary manner). The size of the associated display element 601 at the end of the predetermined period may be larger than the size of the associated display element 601 at the beginning of the predetermined period. Alternatively, the size of the associated display element 601 at the end of the predetermined period may be smaller or the same size as the associated display element 601 at the beginning of the predetermined period.

In another example, a first display element is associated with a modal window. Activation of the first display element causes the associated modal window to be displayed in proximity to, juxtaposed or adjacent to, or overlapping the first display element. The modal window may be displayed at increasing sizes through animation over a predetermined period of time after activation of the associated modal window. During display of the associated modal window, control is provided via the associated modal window such that the first display element is in an inactive state.

Also in this example, the size of the first display element may be decreased through animation over a predetermined period of time after activation of the associated modal window. Hence, by the end of the predetermined period of time, the first display element may be smaller than the size of the first display element at the beginning or just before the commencement of the predetermined period of time. Also, the associated modal window may be larger than the first display element by the end of the predetermined period of time. Alternatively, the size of the associated modal window may be larger than the size of the associated modal window at the beginning of the predetermined period of time. During the predetermined period of time, the size of either the first display element and/or the associated modal window may also vary arbitrarily (increase, decrease or both).

Figure 7:
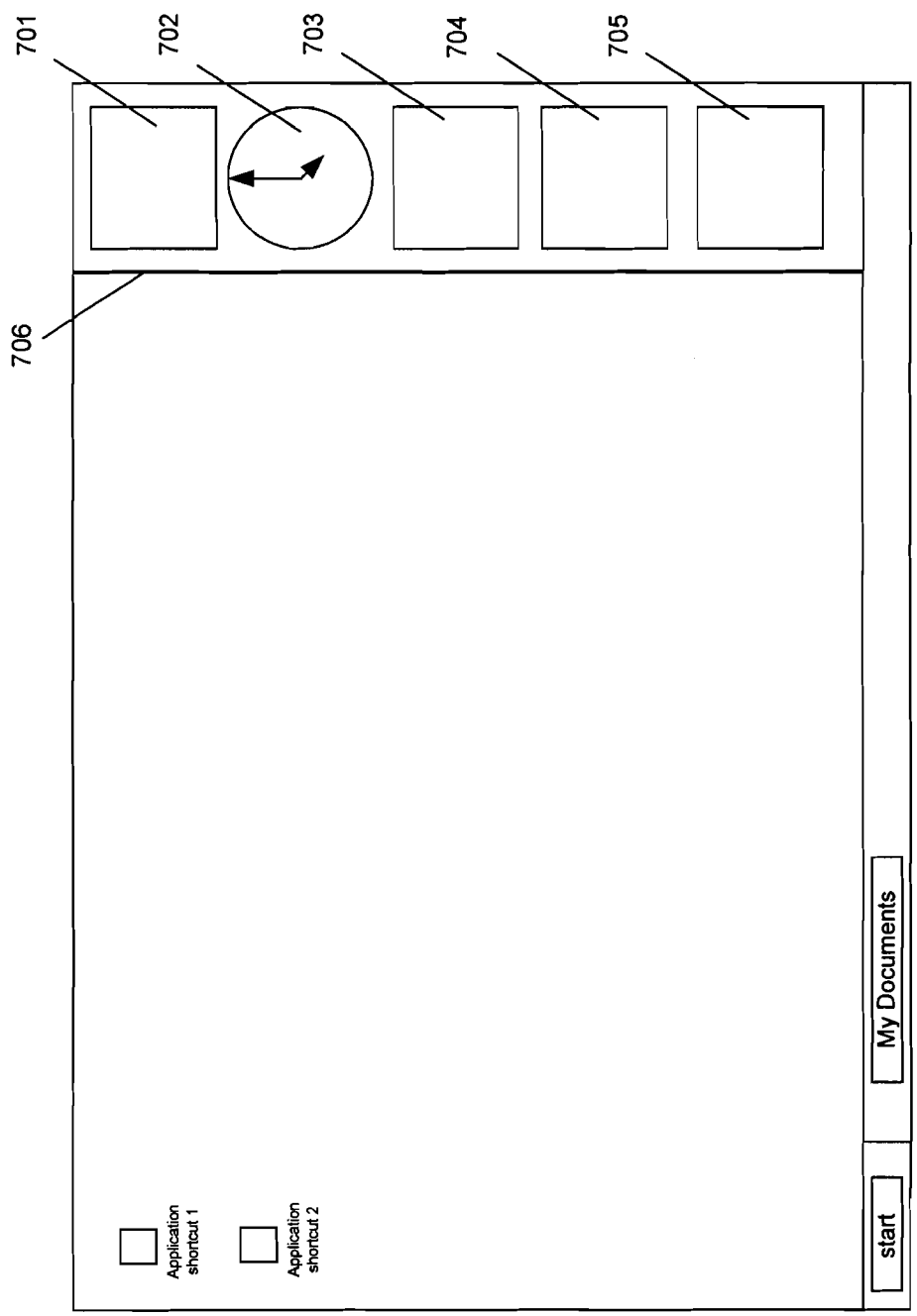
FIG. 7 illustrates an example of displaying gadgets on a display.

FIG. 7 illustrates an example of displaying gadgets on a display. A gadget may be contained in a sidebar as illustrated in the example of FIG. 7 and may provide dynamic information (i.e., information that may change dynamically over time and may be presented in an updated form to a user in real-time). Gadgets may also have associated settings or controls. The settings or controls associated with a gadget may be provided in a secondary display element.

As FIG. 7 illustrates, the dynamic information elements or gadgets (701-705) are displayed in a predetermined or designated area 706 on the desktop 401 which is demarcated by a solid line. In this case, the designated area 706 is a sidebar that traverses the right vertical side of the desktop. The designated area 706 in this example (i.e., the sidebar 706) provides a location on the desktop in which dynamic information may be presented to a user in a convenient and organized manner. In addition, control and/or settings associated with each element in the sidebar 706 may be provided in a secondary display element (not shown).

In this example, selection of a gadget (e.g., 701-705) may cause the display of an associated display element such as a settings/control window or other modal window. An animation may be provided for depicting the association between a gadget (e.g., gadget 701-705) and an associated display element. For example, the animation may depict an associated display element (associated with a gadget) to appear to be in contact with the gadget. The association may be depicted via the animation in a variety of ways. For example, the association may be depicted as the associated display element as appearing to be adjacent to, juxtaposed to, in proximity of, in contact with, or overlapping the gadget.

Figure 8:
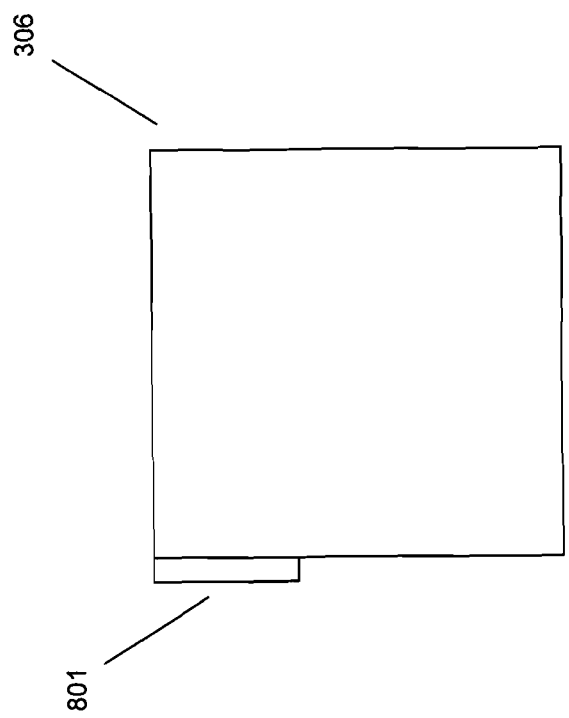
FIG. 8 illustrates an enlarged view of a gadget of FIG. 7.
Figure 9:
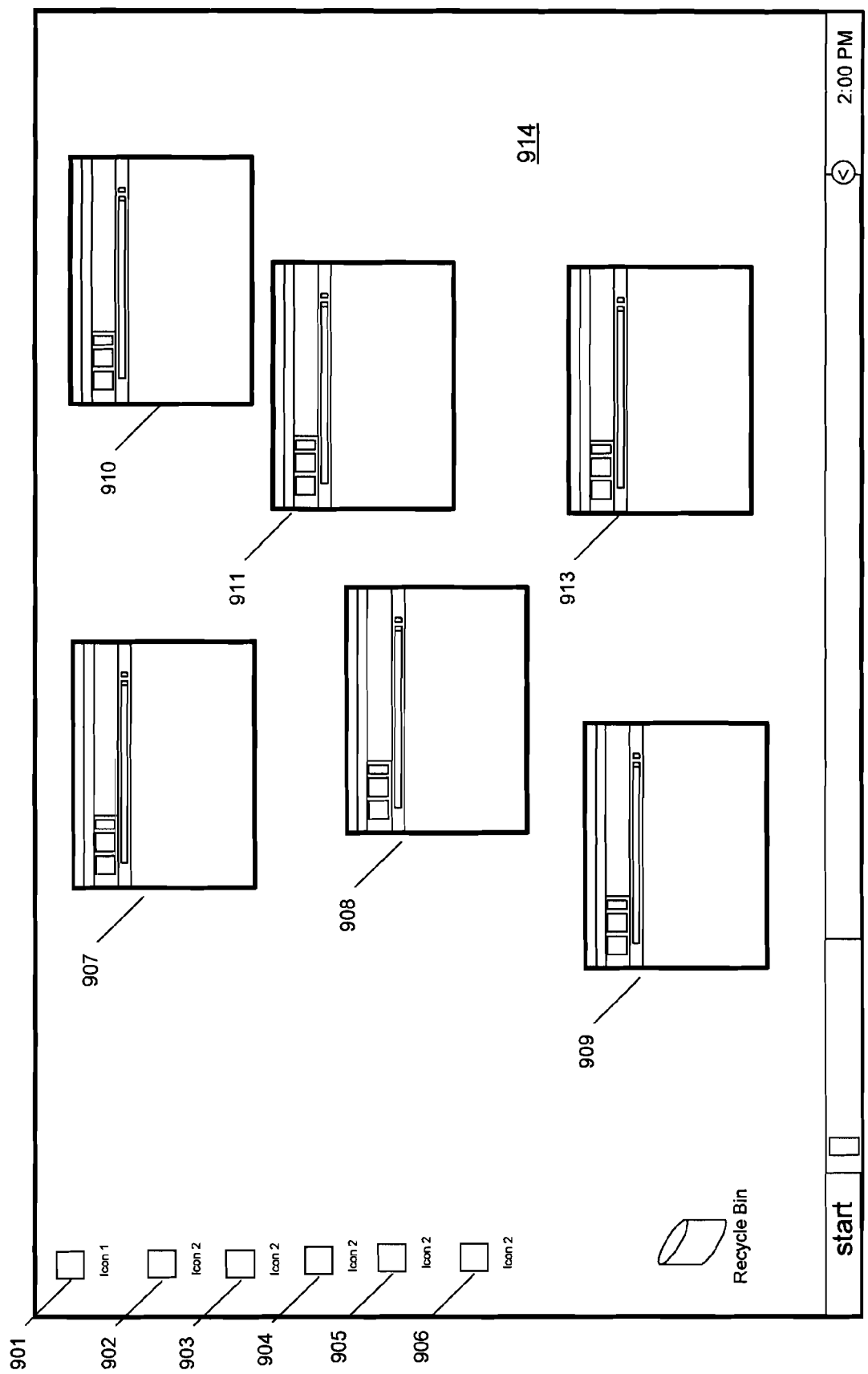
FIG. 9 illustrates an example of a computer display containing multiple windows and icons.

The associated display element may be displayed in response to an input command. In one example, the gadget may include a portion which, when selected, causes the display of the associated display element. For example, FIG. 8 illustrates an enlarged view of gadget 701. The gadget interface includes a portion 801 which, when activated, causes the display of an associated display element. For example, activation of the portion 801 may cause the display of a control window, settings window or other modal window associated with the gadget 701. The portion 801 is illustrated in FIG. 8 as being adjacent and appearing to be in contact with the gadget 701. However, the portion 801 may be located in any convenient location with respect to the gadget 701. For example, the portion 801 may be located separately from but in proximity to the gadget 701 or may be co-located with the gadget 701. The portion 801 may alternatively be located in a separate location which is not proximate to the gadget 701.

Activation of the portion 801 may cause the display of the associated display element such that the associated display element may increase in size through animation over a predetermined period of time. The predetermined period of time may be any desired length of time and may be controlled by a user. The predetermined period of time may also be instantaneous such that the change in size of the associated display element is instantaneous.

Also, the size of the gadget 701 may decrease in size over the predetermined period of time through animation such that the size of the gadget 701 before the predetermined period of time is larger than the size of the gadget 701 after the predetermined period of time has elapsed. Likewise, the size of the associated display element (e.g., the control or settings window or other modal window) over the predetermined period of time may increase such that the size of the associated display element at the end of the predetermined period of time may be larger than the size of the associated display element at the beginning of the predetermined period of time.

As described, an animation may depict an association between the first display element (i.e., the gadget 701 in this example) and the associated display element (i.e., the control/settings window or other modal window associated with the gadget 701). For example, the animation may display the gadget and associated display element at particular relative sizes and/or locations. For example, at least a portion of the gadget 701 may appear to be in contact through the animation with at least a portion of the settings control window or at least a portion of the setting control window or other modal window overlapping at least a portion of the gadget 701. In another example, the at least a portion of the window may partially obscure the gadget 701. Also, the animation may depict the size of the gadget 701 as decreasing and the size of the control/settings or other modal window as increasing over a predetermined period of time (which may also be instantaneous). Also, the animation may depict the associated display element (i.e., settings control window or other modal window) as "springing from" the gadget 701 such that the animation depicts a small version of the settings control/modal window as appearing to be in proximity, in contact or overlapping the gadget 701 responsive to activation of a portion 801. The animation may further depict the size of the settings control/modal window as increasing over a predetermined period of time following activation of the portion 801 while the size of the gadget 701 may decrease over the predetermined period of time. At the end of the predetermined period of time, the size of the control/setting/modal window may be larger than the size of the gadget 701. Further, at least a portion of the settings control/modal window may overlap and obscure at least a portion of the gadget 701.

It is understood that aspects of the present invention can take many forms and aspects. The embodiments shown herein are intended to illustrate rather than to limit the invention, it being appreciated that variations may be made without departing from the spirit of the scope of the invention. Although illustrative aspects of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

We claim:

1. A method comprising:
   displaying a first display element on a display, the first display element comprising an icon including a portion that occupies less area than the entire icon and that is selectable via user input to invoke a command to cause display of a second display element;
   receiving the user input at the portion of the first display element to cause display of the second display element, the second display element being associated with the first display element, subordinate to the first display element, and selectable via user input;
   responsive to receiving the user input at the first display element:
   displaying the second display element concurrently with the first display element on the display, the first display element and the second display element both displaying related information;
   visually associating the first display element and the second display element by changing a size of the first display element from a first size to a second size during the concurrent display; and
   blocking the first display element from responding to user input during the concurrent display; and
   displaying, at the second display element, dynamic information that corresponds to content associated with the first display element.

2. The method of claim 1, wherein the first display element and the second display element display information related to one or more of traffic, stocks, news, weather, or sport scores and wherein the second display element is subordinate to the first display element.

3. The method of claim 1, wherein visually associating the first display element and the second display element includes displaying at least a portion of the second display element so that the portion of the second display element visually appears to contact or overlap at least a portion of the first display element.

4. The method of claim 1, wherein the first size is larger than the second size.

5. The method of claim 1, wherein visually associating the first display element and the second display element comprises changing a size of the second display element from a third size to a fourth size, wherein the third size is smaller than the fourth size.

6. The method of claim 5, wherein changing the size of the first display element occurs over a first predetermined period of time and changing the size of the second display element occurs over a second predetermined period of time.

7. The method of claim 6, wherein the size of the first display element is different than the size of the second display element at the end of the first predetermined period of time and at the end of the second predetermined period of time.

8. The method of claim 7, wherein the size of the first display element is smaller than the size of the second display element at the end of the first predetermined period of time.

9. The method of claim 7, wherein the first predetermined period of time is about equal in duration to the second predetermined period of time.

10. The method of claim 1, wherein the related information displayed by the first display element and the second display element comprises dynamic information corresponding to a same entity.

11. The method of claim 1, wherein the dynamic information in the second display element comprises more detailed information describing the content associated with the first display element.

12. The method of claim 1 further comprising:
receiving a command to dismiss the displayed second display element from display; and
restoring interactive responsiveness of the first display element so that the first display element is no longer blocked from responding to user input.

13. A system for visually associating display elements on a display, said system comprising:
a display device configured to display first and second user-interactive display elements that each display up-to-date information in real-time, the first user-interactive display element comprising an icon including a portion that occupies less area than the entire icon and that is selectable via user input to invoke a command to cause display of the second user-interactive display element;
an input device for receiving the command to display the second user-interactive display element, the second user-interactive display element configured to display information related to information displayed by the first user-interactive display element;
the display device further configured to visually associate the first and second user-interactive display elements by animating the first and second user-interactive display elements dependent upon content displayed by the first user-interactive display element
the display device further configured to block the first user-interactive display element from responding to user input during display of the second user-interactive display element; and
the display device further configured to change a size of the first user-interactive display element from a first size to a second size and change a size of the second user-interactive display element from a third size to a fourth size.

14. The system of claim 13, wherein the display device is further configured to dismiss the second user-interactive display element from display and restore interactive responsiveness of the first user-interactive display element so that the first user-interactive display element is no longer blocked from responding to user input.

15. The system of claim 13, wherein the first user-interactive display element and the second user-interactive display element are configured to display dynamic information corresponding to a same entity.

16. The system of claim 13, wherein the visual association of the first user-interactive display element and the second user-interactive display element includes displaying at least a portion of the second user-interactive display element so that the portion of the second user-interactive display element visually appears to contact or overlap at least a portion of the first user-interactive display element.

17. The system of claim 13, wherein the visual association of the first user-interactive display element and the second user-interactive display element includes changing a size of the first user-interactive display element from a first size to a second size.

18. A method comprising:
displaying a first display element, the first display element comprising an icon including a portion that occupies less area than an area of the entire icon and that is selectable via user input to invoke a command to cause display of a second display element;
displaying the second display element concurrently with the first display element responsive to receiving user input, the first display element and the second display element both displaying related information corresponding to a same entity;
visually associating the first display element and the second display element on a graphical user interface, based on content displayed by the first display element, by animating the second display element so that the second display element visually springs from the first display element;
blocking the first display element from responding to user input during display of the second display element; and
animating the first display element and the second display element by concurrently changing a size of the first display element and a size of the second display element.

19. The method of claim 18, wherein the second display element displays additional detail describing information displayed by the first display element.

20. The method of claim 18, further comprising dismissing the second display element from display and restoring interactive responsiveness of the first display element so that the first display element is no longer blocked from responding to user input.

* * * * *